United States Patent Office 3,201,373
Patented Aug. 17, 1965

3,201,373
SYNTHETIC CHLORINE CONTAINING RUBBER-ACRYLATE TYPE POLYMERS
Samuel Kaizerman, Plainfield, N.J., assignor to American Cyanamid Company, Stamford, Conn., a corporation of Maine
No Drawing. Filed June 19, 1962, Ser. No. 203,463
10 Claims. (Cl. 260—79.5)

This invention is concerned with new and improved synthetic, rubber-like, vulcanizable, elastomeric copolymers. More particularly, this invention relates to a novel group of copolymers of an alkyl acrylate and vinyl chloroacetate; to the manufacture thereof; to the compounding thereof into vulcanizable compositions; to the vulcanization thereof; and to the resultant products, both vulcanizable and vulcanized.

Specialty elastomers based on polymers of alkyl acrylates were introduced to the trade many years ago. Perhaps the most used and generally-preferred elastomers have comprised copolymers of ethyl acrylate with some five percent of a copolymerizable chlorine-containing monomer, such as 2-chloroethyl vinyl ether or 2-chloroethyl acrylate. One such copolymer of 2-chloroethyl vinyl ether, for example, is a commercial product known as Lactoprene EV. Halogen-free polyacrylic ester elastomers also have been introduced commercially.

Such acrylic elastomers are of particular interest because of their outstanding resistance to deterioration due to heat. They perhaps have the best such properties of all commercial rubbers, except for some silicones and some highly-fluorinated elastomers made for special applications. They also are highly resistant to flexural breakdown, compression set, ozone, ultraviolet light, mineral oils and gas diffusion. They have been recommended and widely used in gaskets, hose, conveyor belts, valve seats, packings, oil seals, printing rolls, protective coatings, transformer leads, electrical insulation and the like.

Polyacrylic esters contain reactive groups which can be used for vulcanization with some special recipes. Unfortunately, the number of such recipes and thus the opportunity for preparing vulcanizates of different types and properties are limited. For this reason, much attention has been given to preparing polyacrylates having reactive functional groups that facilitate vulcanization.

Such functional groups have been introduced by copolymerizing ethyl acrylate with some five percent of some copolymerizable monomer containing the desired group. Among the latter, for example, are included olefinic linkages and halogen, carbonyl, cyano and/or other known groupings capable of imparting the desired properties.

One commercially-available copolymer commonly designated as Hycar PA, an elastomeric polymer of an acrylic ester, became commercially-available as early as 1947. A subsequent modification (Hycar PA–21) now known as Hycar 4021 become available in 1948. In respect to vulcanization, Hycar 4021 is more versatile than Hycar PA and similar in composition to Lactoprene EV. Such chlorine-containing elastomers have better milling properties; less tendency to scorch on the mill; better mold ability; and more water-resistance than those not containing chlorine.

Illustratively, a 95/5 copolymer of ethyl acrylate and chloroethyl vinyl ether can be vulcanized with suitable curing agents, including amines and sulfur, in conjunction with many conventional accelerators. The combination of sulfur and Trimene Base (a commercially-available ethyl chloride, formaldehyde, ammonia reaction product) is perhaps that used most frequently.

Nevertheless, heretofore-available acrylic elastomers, including the above-noted copolymers of ethyl acrylate and choloroethyl vinyl ether, have been subject in use to several limitations and disadvantages; notably the various problems involved in vulcanization. Not the least of these has been the impossibility of curing combinations of such acrylic elastomers with neoprene-type rubbers.

Suitable curing agents for neoprene rubbers were found unsatisfactory for the acrylic elastomer, and vice versa. Consequently, an acrylic elastomer which is not subject to such problems has been commercially desirable. It is, therefore, a principal object of the principle invention to provide such an elastomer.

In spite of the failures previously encountered in attempts to produce such an elastomer, this object has been accomplished. Moreover, in accordance with the present invention, provision of such an elastomer has been accomplished to a surprisingly successful degree.

These new elastomers of the present invention are based on copolymers of alkyl acrylates and vinyl chloroacetate. As such, these new copolymers can be vulcanized with the commercially-available curing agents previously used in curing known acrylic elastomers. However, the new copolymers of this invention also can be cured with various curing or vulcanizing agents normally employed for "non-acrylic" elastomers, and which are not usable with the above-noted, previously-available acrylic elastomers.

When thus described in general terms, i.e., simply as a copolymer of an alkyl acrylate and vinyl chloroacetate, such a solution of the old problem is seemingly simple. However, the simplicity is more seeming than real. A number of factors must be selected and controlled in order to obtain the desired results.

Once this has been done, copolymers are obtained which are new in composition and properties. Additionally, in use they offer many commercially-desirable advantages. Among these may be listed the following:

(1) More ready and convenient curing or vulcanization;

(2) More rapidly curing with standard curing agents; a feature of marked importance in manufacturing small, intricately-shaped articles wherein, for most efficient utilization of the molds, it is advantageous to have very short curing periods;

(3) A much greater variety of crosslinking agents (i.e., vulcanizing agents) may be used;

(4) Blends with neoprene-type rubbers may be readily vulcanized; and (5) Resultant vulcanized products have superior properties, meeting demands which existed but could not be adequately met.

As to the alkyl acrylates employed, none are new per se. The alkyl group may be straight or branched chain. One acrylate ester may be used alone or several in combination. Useful results are obtained using such acrylate esters as the methyl, ethyl, propyl, butyl, hexyl, and octyl; however, the ethyl and butyl esters are preferred. Accordingly, they will be used herein for purposes of illustration.

As to the desirable proportions of monomeric acrylate ester and vinyl chloroacetate (hereinafter referred to for simplicity as VCA) the product copolymer should contain at least seventy weight percent of the alkyl acrylate. A sufficient amount to obtain this result must be used. Preferably, the VCA should comprise from about two to about eight weight percent of the whole. In some special cases, if necessary or desirable to obtain special properties, this may be reduced to as little as about 0.5% or increased to about 15%. Also, if so desired, the product copolymer may contain one or more additional copolymerized compatible comonomers, such for example as acrylonitrile. When used, such extraneous comonomers may comprise as much as about fifteen percent of the composition.

An advantage of the invention is that no special or unusual methods of copolymerization are required. Several well known techniques are suitable for the purpose. Their use does not comprise an element in this invention. Polymerization by both the emulsion and the suspension techniques produce good results. Conventional catalysts may be used.

However, in this respect further consideration must be given to the acrylate ester: VCA proportions. Within the above-noted ranges, monomer compositions are subjected to copolymerization. The copolymer product, however, does not contain an equivalent chlorine content to that of theory. Charging a 95/5 mixture of ethyl acrylate/VCA for example should theoretically produce a product of about 1.4% chlorine whereas only about 0.6–0.8% will be found. Definition of the product must therefore be made more accurate since different products are obtainable from monomer compositions of the same proportions.

Accordingly, the final product should contain at least the above-noted seventy weight percent of ethyl acrylate, or its equivalent. However, the VCA content is perhaps most usefully defined in terms of the chlorine content of the product copolymer. In general, this chlorine content must be at least that sufficient to permit satisfactory vulcanization. At the other limit the vulcanized copolymer must not be too stiff, "boardy" or brittle and its modulus must not be too high.

In terms of corresponding numerical limitations, a useful copolymer should contain at least about 0.4 weight percent of chlorine. It is more desirable that a minimum of about 0.6% be present. As to the upper limit, for some purposes the chlorine content may be as high as about three percent. In general use, a content above about two percent will seldom be encountered. Thus the broad range may be from about 0.4 to about 3.0%, but the range usually encountered is from about 0.6 to about 2.0 percent. Within the latter range, highly desirable products and those generally preferred will be found to contain some 0.90 to about 1.05 percent; roughly an average content of about one percent.

Further description of the present invention will be made in conjunction with the following illustrative example. Therein, unless otherwise noted, all parts and percentages are by weight and all temperatures are in degrees C. It will be noted that in each case where chlorine content is given, the figure is qualified as "about." This is done because, while the percentages given are those found, standard methods unavoidably may result in some spread in the results found in repeated observations.

EXAMPLE 1

A solution of about three parts of sodium lauryl sulfate in 200 parts of water is brought to about 50° C. in a suitable reaction vessel and air in the system is displaced with nitrogen. Thereto, a mixture of 95 parts of ethyl acrylate, 5 parts of VCA and 0.3 part of potassium persulfate is added with stirring. Agitation at about 50° C. is continued for about three hours and the resulting latex is cooled. Coagulation is accomplished by adding a concentrated aqueous solution of calcium chloride; the copolymer solids are separated by filtration, washed with water until free of salts and dried. The copolymer (92 parts) represents a conversion of about 92%. The chlorine content is about 0.96 percent.

For purposes of simplification, displacement of the air with nitrogen and conducting the reaction thereunder is omitted in the following examples. As is well known in the art, this practice, or its equivalent, is conventional. It is to be understood this procedure is followed in each case though not specifically noted.

EXAMPLE 2

A solution of 0.1 part of polyvinyl alcohol in 200 parts of water is brought to about 70° C. Thereto is added with agitation a solution consisting of 95 parts of ethyl acrylate, 5 parts of VCA and 0.1 part of benzoyl peroxide. After maintainiing constant stirring at about 70° C. for about two hours, the reaction mixture is cooled to room temperature, filtered and the collected product copolymer is dried. The copolymer (97 parts) represents a conversion of about 97%. The chlorine content is about 0.82 percent.

EXAMPLE 3

The procedure of Example 2 is followed except that 97.5 parts of ethyl acrylate and only 2.5 parts of VCA are employed. Conversion is about 95% and the chlorine content is about 0.58 percent.

EXAMPLE 4

The temperature of a solution of 0.1 part of polyvinyl alcohol in 200 parts of water is brought to about 70° C. Thereto a solution consisting of 87.5 parts of butyl acrylate, 10 parts of acrylonitrile, 2.5 parts of VCA and 1 part of benzoyl peroxide is then added with stirring. Reaction conditions are maintained for about 3.5 hours, the resulting copolymer being then recovered as in Example 2. The dry product polymer (80 parts) represents a conversion of 80%. The chlorine content is about 0.64 percent.

EXAMPLE 5

Example 4 is repeated, but omitting the ten parts of acrylonitrile. Somewhat higher conversion (about 85%) is obtained with a chlorine content of about 0.62 percent.

EXAMPLE 6

Example 5 is repeated but substituting 95 parts of hexyl acrylate for the butyl acrylate and using five parts of VCA. The dried copolymer (80 parts) has a chlorine content of about 0.77 percent and represents a conversion of about 80%.

EXAMPLE 7

Each of the copolymers prepared by the procedures of Examples 1–3, was compounded in conventional apparatus (roll mill) using the formula shown in the following table, and amine cured at the temperature and for the time shown. The tensile strength and elongation are shown in the same table.

*Table 1*

| Product of Example | 1 | 2 | 3 |
|---|---|---|---|
| Copolymer | 100 | 100 | 100 |
| FEF Carbon Black [1] | 50 | 50 | 50 |
| Stearic Acid | 1 | 2 | 2 |
| Triethylene tetramine | 1.5 | 1.5 | 1.5 |
| Curing Temp. (° C.) | 150 | 160 | 160 |
| Curing time (min.) | 30 | 30 | 60 |
| Tensile strength (p.s.i.g.) | 1,775 | 1,800 | 1,350 |
| Percent Elongation | 300 | 210 | 44 |

[1] Fast extruding furnace carbon black.

As noted above, copolymer products of this invention can be cured by any of a number of curing agents normally used in curing acrylic elastomers and in addition can be cured with agents not normally found suitable with acrylic elastomers. Among such agents excellent results are obtainable using various thiazolidinethiones shown in the copending application of Sullivan et al., Serial No. 176,435, filed February 28, 1962, and assigned to a common assignee.

For purposes of comparison, a sample of a commercially-available copolymer of 95% ethyl acrylate and 5% vinyl chloroethyl ether and having a product chlorine content of about 1.5% was obtained. It was used in the following example.

EXAMPLE 8

Samples (100 parts each) of the above-noted commercial product copolymer and of the copolymer of Example 2 are compounded by conventional milling into the following formulation:

| | Parts |
|---|---|
| Copolymer | 100 |
| SRF carbon black | 50 |
| Stearic acid | 2 |
| MgO | 2 |
| Accelerator [1] | 1.5 |

[1] 2-methyl-3-thiazolidinethione.

The resultant formulations are cured in a mold for 30 minutes at about 160° C. The tensile strength and percent elongation are found as follows:

| Copolymer | Tensile Strength (p.s.i.) | Elongation (percent) |
|---|---|---|
| Example 2 | 1,400 | 600 |
| Commercial [2] | 200 | 1,100 |

[2] Hycar 4201, (supra).

These results clearly demonstrate that copolymers of this invention can be cured effectively with a vulcanization agent suitable for neoprene-type rubbers, whereas a previously-available commercial elastomer of the acrylic type cannot.

As noted above, two marked advantages of the product of the present invention over previously-available products containing copolymerized chlorine-containing monomers is in the speed of cure and the permissible use of conventional accelerators. Both are readily demonstrated, as in the following example using a commercial accelerator.

EXAMPLE 9

Samples (100 parts each) of the two copolymers of Example 8 are compounded by the procedure thereof with 40 parts of FEF carbon black, one part of stearic acid, 2 parts of benzothiazyldisulfide (accelerator) and 1.5 parts of triethylene tetramine. The compounded copolymer was then cured in a mold at 160° C. using curing times of 3 minutes and 4 minutes. Properties of the two resultant vulcanizates are shown below in Table II.

Table II

| Polymer | Product of Ex. 2 | | Commercial Elastomer | |
|---|---|---|---|---|
| Cure (minutes) | 3 | 4 | 3 | 4 |
| Cure (° C.) | 160 | 160 | 160 | 160 |
| Tensile strength (p.s.i.) | 1,300 | 1,275 | 175 | 325 |
| Percent Elongation | 800 | 700 | 1,000 | 1,000+ |
| Modulus: | | | | |
| 200% | 275 | 250 | 125 | 150 |
| 300% | 525 | 525 | | 175 |
| Hardness (Shore A) | 41 | 41 | 37 | 38 |

These results not only demonstrate the rapidity with which the copolymers of this invention can be cured to satisfactory products as compared with a typical, previously-available commercial acrylic elastomer. The latter failed completely to produce useful products under the same conditions.

I claim:

1. A sulfur-vulcanizable synthetic elastomer obtained by copolymerizing in the presence of a free radical catalyst a mixture containing at least 70 weight percent of an alkylacrylate and sufficient vinylchloroacetate to produce in the elastomer a chlorine content of about 0.4 to about 3 weight percent chlorine, the alkyl groups in said alkylacrylate containing from 1-8 carbon atoms.

2. An elastomer according to claim 1 in which the chlorine content is in the range of from about 0.6 to about two percent.

3. An elastomer according to claim 1 in which the chlorine content is in the range of from about 0.90 to about 1.05 percent.

4. An elastomer according to claim 1 in which the acrylate is ethyl acrylate.

5. An elastomer according to claim 1 in which the acrylate is butyl acrylate.

6. A vulcanized copolymer elastomer of claim 1.
7. A vulcanized copolymer elastomer of claim 2.
8. A vulcanized copolymer elastomer of claim 3.
9. A vulcanized copolymer elastomer of claim 4.
10. A vulcanized copolymer elastomer of claim 5.

References Cited by the Examiner

UNITED STATES PATENTS 2,643,922  6/53  Gluesenkamp et al. ____ 260—85.7
2,742,942  4/56  Owen _____ 260—86.1

JOSEPH L. SCHOFER, *Primary Examiner.*

J. R. LIBERMAN, *Examiner.*